(12) United States Patent
Imai et al.

(10) Patent No.: US 11,428,309 B2
(45) Date of Patent: Aug. 30, 2022

(54) TOROIDAL CONTINUOUSLY VARIABLE TRANSMISSION

(71) Applicant: KAWASAKI JUKOGYO KABUSHIKI KAISHA, Kobe (JP)

(72) Inventors: Hideyuki Imai, Akashi (JP); Keigo Maehata, Kobe (JP); Kenichiro Tanaka, Kobe (JP); Kenji Komatsu, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 163 days.

(21) Appl. No.: 16/758,489

(22) PCT Filed: Oct. 18, 2018

(86) PCT No.: PCT/JP2018/038861
§ 371 (c)(1),
(2) Date: Apr. 23, 2020

(87) PCT Pub. No.: WO2019/082792
PCT Pub. Date: May 2, 2019

(65) Prior Publication Data
US 2021/0364080 A1 Nov. 25, 2021

(30) Foreign Application Priority Data

Oct. 27, 2017 (JP) .............................. JP2017-208510

(51) Int. Cl.
*F16H 15/38* (2006.01)
*F16H 57/04* (2010.01)

(52) U.S. Cl.
CPC ........... *F16H 57/049* (2013.01); *F16H 15/38* (2013.01); *F16H 57/043* (2013.01); *F16H 2015/386* (2013.01)

(58) Field of Classification Search
CPC ... F16H 15/38; F16H 57/049; F16H 2015/386
See application file for complete search history.

(56) References Cited

U.S. PATENT DOCUMENTS

| 6,409,625 | B1 * | 6/2002 | Sakai | ...................... F16H 15/38 475/2 |
| 6,616,568 | B2 * | 9/2003 | Ooyama | ................. F16H 15/38 476/40 |

(Continued)

FOREIGN PATENT DOCUMENTS

| JP | 07-027193 A | 1/1995 |
| JP | 08-145138 A | 6/1996 |

(Continued)

*Primary Examiner* — William C Joyce
(74) *Attorney, Agent, or Firm* — Sughrue Mion, PLLC

(57) ABSTRACT

A toroidal continuously variable transmission includes: first and second pistons attached to a shaft portion of a trunnion so as to be externally fitted to the shaft portion, the first and second pistons being arranged so as to be lined up in a direction along a tilt axis; and a cylinder forming a first pressure chamber which makes the first piston move toward a first side in the direction along the tilt axis and a second pressure chamber which makes the second piston move toward a second side in the direction along the tilt axis. The cylinder includes a first lubricating oil passage, and the shaft portion of the trunnion includes a second lubricating oil passage. A third lubricating oil passage through which the first lubricating oil passage communicates with the second lubricating oil passage is formed between the first piston and the second piston.

5 Claims, 6 Drawing Sheets

(56) References Cited

U.S. PATENT DOCUMENTS

| | | | | |
|---|---|---|---|---|
| 6,746,364 B2* | 6/2004 | Imanishi | ............... | F16H 15/38 476/40 |
| 6,979,277 B2* | 12/2005 | Ishikawa | ............... | F16H 15/38 476/40 |
| 7,563,192 B2* | 7/2009 | Imanishi | ............... | F16H 15/38 476/46 |

FOREIGN PATENT DOCUMENTS

| | | |
|---|---|---|
| JP | 2007-154952 A | 6/2007 |
| JP | 2016-050596 A | 4/2016 |

\* cited by examiner

TOROIDAL CONTINUOUSLY VARIABLE TRANSMISSION

CROSS REFERENCE TO RELATED APPLICATIONS

This application is a National Stage of International Application No. PCT/JP2018/038861 filed Oct. 18, 2018, claiming priority based on Japanese Patent Application No. 2017-208510 filed Oct. 27, 2017, the entire contents of which are incorporated herein by reference.

TECHNICAL FIELD

The present invention relates to a toroidal continuously variable transmission.

BACKGROUND ART

In a toroidal continuously variable transmission, a tiltable power roller is sandwiched between an input disc and an output disc. When a trunnion rotatably supporting the power roller is made to advance or retreat by a hydraulic actuator, the power roller is tilted, and with this, a transmission ratio is continuously changed. The hydraulic actuator is configured such that a piston including a piston main body portion and a boss portion is accommodating in a cylinder, the boss portion projecting from an inner-diameter end portion of the piston main body portion. According to the configuration of PTL 1, a lubricating oil passage is formed inside a shaft portion of the trunnion, and lubricating oil flowing through the lubricating oil passage is discharged toward the power roller.

CITATION LIST

Patent Literature

PTL 1: Japanese Laid-Open Patent Application Publication No. 2007-154952

SUMMARY OF INVENTION

Technical Problem

However, according to PTL 1, since the hydraulic actuator and an inflow port of the lubricating oil passage are arranged side by side in a direction along an axis of the trunnion, the shaft portion of the trunnion and the cylinder tend to become long in the direction along the axis.

An object of the present invention is to, in a toroidal continuously variable transmission, reduce the size of a shaft portion of a trunnion and the size of a cylinder in a direction along an axis while forming a lubricating oil passage at the shaft portion of the trunnion.

Solution to Problem

A toroidal continuously variable transmission according to one aspect of the present invention includes: input and output discs arranged so as to be opposed to each other; a power roller sandwiched between the input disc and the output disc so as to be tiltable, the power roller being configured to transmit rotational driving force of the input disc to the output disc at a transmission ratio corresponding to a tilting angle of the power roller; a trunnion supporting the power roller and configured to be tiltable about a tilt axis of the power roller and reciprocatable in a direction along the tilt axis, the trunnion including a main body portion and a shaft portion, the main body portion supporting the power roller, the shaft portion extending in the direction along the tilt axis; first and second pistons attached to the shaft portion of the trunnion so as to be externally fitted to the shaft portion, the first and second pistons being arranged so as to be lined up in the direction along the tilt axis; and a cylinder forming a first pressure chamber which makes the first piston move toward a first side in the direction along the tilt axis and a second pressure chamber which makes the second piston move toward a second side in the direction along the tilt axis. The cylinder includes a first lubricating oil passage to which lubricating oil is supplied. The shaft portion includes a second lubricating oil passage through which the lubricating oil flows toward the power roller. A third lubricating oil passage through which the first lubricating oil passage communicates with the second lubricating oil passage is formed between the first piston and the second piston.

According to the above configuration, the third lubricating oil passage through which the first lubricating oil passage formed at the cylinder communicates with the second lubricating oil passage formed at the shaft portion of the trunnion is formed between the first piston and the second piston. Therefore, spaces in the direction along the axis are more effectively utilized than a case where the third lubricating oil passage is formed between an end portion of the shaft portion of the trunnion and the hydraulic actuator including the first piston and the second piston. On this account, the shaft portion of the trunnion and the cylinder can be reduced in size in the direction along the axis while forming the lubricating oil passage at the shaft portion of the trunnion.

The toroidal continuously variable transmission may be configured such that: the cylinder further includes a first pressure oil passage through which pressure oil is supplied to the first pressure chamber and a second pressure oil passage through which the pressure oil is supplied to the second pressure chamber; and the first lubricating oil passage, the first pressure oil passage, and the second pressure oil passage are arranged in a region between the first pressure chamber and the second pressure chamber in the direction along the tilt axis.

According to the above configuration, since the first lubricating oil passage, the first pressure oil passage, and the second pressure oil passage are arranged in a region between the first pressure chamber and the second pressure chamber, the cylinder can be further reduced in size in the direction along the axis.

The toroidal continuously variable transmission may be configured such that a position of at least a part of the first lubricating oil passage in the direction along the tilt axis overlaps a position of a part of at least one of the first pressure oil passage and the second pressure oil passage in the direction along the tilt axis.

According to the above configuration, a region of the cylinder which region is located between the first pressure chamber and the second pressure chamber can be further shortened in the direction along the axis.

The toroidal continuously variable transmission may be configured such that: the first piston includes an annular first piston main body portion forming the first pressure chamber and a tubular first boss portion projecting from an inner-diameter side of the first piston main body portion toward the second piston; the second piston includes an annular second piston main body portion forming the second pressure chamber and a tubular second boss portion projecting from an inner-diameter side of the second piston main body portion toward the first piston; and the third lubricating oil passage is formed between the first boss portion and the second boss portion.

According to the above configuration, a hole as the third lubricating oil passage does not have to be formed at the first piston or the second piston. Thus, the configuration is simplified, and manufacture is facilitated.

The toroidal continuously variable transmission may be configured such that: a first inside gap is formed between an inner peripheral surface of the first piston and an outer peripheral surface of the shaft portion of the trunnion; and a second inside gap is formed between an inner peripheral surface of the second piston and the outer peripheral surface of the shaft portion of the trunnion.

According to the above configuration, the gap is formed between the outer peripheral surface of the shaft portion of the trunnion and the inner peripheral surface of each piston. Therefore, even if an assembly error occurs, each piston is moved relative to the trunnion in a radial direction, and this absorbs unbalanced load. Thus, imbalance of sealing pressure between each piston and the cylinder can be prevented. Further, even if the trunnion elastically deforms by a load from the power roller, each piston is moved relative to the trunnion in the radial direction, so that interference between each piston and the cylinder can be prevented. Furthermore, since the pistons are moved independently in the radial direction, the unbalanced load generated between the trunnion and the cylinder can be more suitably absorbed. Since the lubricating oil from the third lubricating oil passage is divided into the lubricating oil flowing to the first inside gap and the lubricating oil flowing to the second inside gap, the lubricating oil can lubricate between each piston and the trunnion while saving spaces.

The toroidal continuously variable transmission according to claim 5 may further include: a first sealing member sandwiched between the inner peripheral surface of the first piston and the outer peripheral surface of the shaft portion of the trunnion; and a second sealing member sandwiched between the inner peripheral surface of the second piston and the outer peripheral surface of the shaft portion of the trunnion. The first sealing member may include a first end portion and a second end portion and extend in a circular shape such that the first end portion is opposed to the second end portion. The second sealing member may include a first end portion and a second end portion and extend in a circular shape such that the first end portion is opposed to the second end portion.

According to the above configuration, the lubricating oil which has reached the first and second inside gaps through the third lubricating oil passage is made to stay at the first and second inside gaps by the sealing members but flows out little by little through a minute gap between the first and second end portions of each sealing member. Thus, the lubricating oil can suitably lubricate between each piston and the trunnion Advantageous Effects of Invention According to the present invention, in the toroidal continuously variable transmission, the shaft portion of the trunnion and the cylinder can be reduced in size in the direction along the axis while forming the lubricating oil passage at the shaft portion of the trunnion.

DESCRIPTION OF EMBODIMENTS

Hereinafter, embodiments will be described with reference to the drawings.

Embodiment 1

Figure 1:
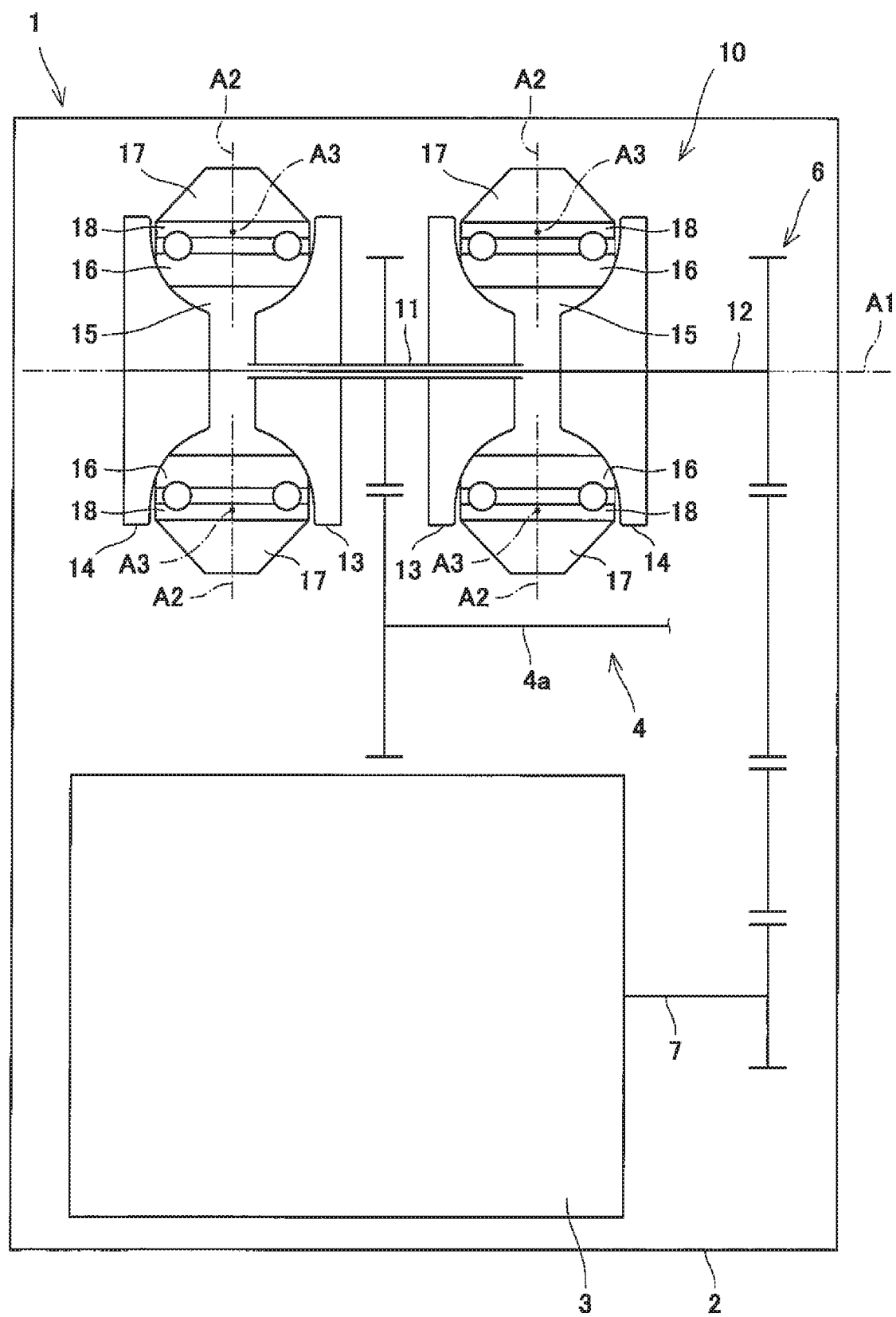
FIG. 1 is a schematic diagram of a drive mechanism-integrated electric power generator including a toroidal continuously variable transmission according to Embodiment 1.

FIG. 1 is a schematic diagram of a drive mechanism-integrated electric power generator 1 including a toroidal continuously variable transmission 10 according to Embodiment 1. As shown in FIG. 1, the drive mechanism-integrated electric power generator 1 (Integrated Drive Generator; hereinafter referred to as an "IDG") includes a casing 2 accommodating a power generator 3 together with the toroidal continuously variable transmission 10 (hereinafter referred to as a "transmission"). The IDG 1 is used as an AC power supply of an aircraft, and the casing 2 is attached to an engine of the aircraft.

The transmission 10 includes a transmission input shaft 11 and a transmission output shaft 12 which are arranged coaxially and can rotate relative to each other (a rotation axis of the two shafts 11 and 12 is referred to as a "transmission axis A1"). The transmission input shaft 11 is connected to an engine rotating shaft (not shown) through an input mechanism 4 including a device input shaft 4a and a power transmission gear mechanism. The device input shaft 4a is parallel to the transmission axis A1. The transmission output shaft 12 is connected to a power generator input shaft 7 through a power transmission mechanism 6 (for example, a parallel axis gear train). The input mechanism 4, the power transmission mechanism 6, and the power generator input shaft 7 are also accommodated in the casing 2.

The transmission 10 changes the speed of the rotation of the transmission input shaft 11 driven by an engine rotational power and outputs the rotation to the transmission output shaft 12. The rotation of the transmission output shaft 12 is output to the power generator input shaft 7 through the power transmission mechanism 6. When the power generator input shaft 7 rotates, the power generator 3 generates AC power at a frequency proportional to a rotational speed of the power generator input shaft 7. Regardless of a change in rotational speed of the engine rotating shaft, a transmission ratio (change gear ratio) of the transmission 10 is continuously controlled such that the rotational speed of the power generator input shaft 7 is maintained at an appropriate value (value corresponding to a frequency suitable for operation of onboard electric components).

The transmission 10 includes input discs 13 and output discs 14. The input discs 13 are provided on an outer peripheral surface of the transmission input shaft 11 so as to rotate integrally with the transmission input shaft 11. The output discs 14 are provided on an outer peripheral surface of the transmission output shaft 12 so as to rotate integrally with the transmission output shaft 12. The input disc 13 and the output disc 14 are arranged so as to be opposed to each other in a direction along the transmission axis A1 in a state where rotation axes of the input and output discs 13 and 14 coincide with each other. The input disc 13 and the output disc 14 form an annular cavity 15 that is continuous in a circumferential direction of the transmission axis A1.

The transmission 10 includes a plurality of power rollers 16 and a plurality of trunnions 17 corresponding one-to-one to the power rollers 16. In the present embodiment, a plurality of power rollers 16 and a plurality of trunnions 17 are provided. The power roller 16 is arranged in the cavity 15. The power roller 16 is supported by the trunnion 17 through a base member 18 so as to be rotatable about a rotation axis A2. The trunnion 17 is supported by the casing 2 so as to be tiltable about a tilt axis A3 and be able to reciprocate in a direction along the tilt axis A3. The tilt axis A3 is located at a skew position with respect to the transmission axis A1, and the rotation axis A2 and the tilt axis A3 are perpendicular to each other.

When the input disc 13 is driven to be rotated, the power roller 16 rotates about the rotation axis A2, and the output disc 14 rotates by the rotation of the power roller 16. When the trunnion 17 and the power roller 16 attached to the trunnion 17 move in a direction along the tilt axis A3, a rotation angle (hereinafter referred to as a "tilting angle") of the power roller 16 about the tilt axis A3 is changed, and the transmission ratio of the transmission 10 is continuously changed in accordance with the tilting angle. As above, in the transmission 10, the rotational power is transmitted from the transmission input shaft 11 to the transmission output shaft 12 by traction drive.

Figure 2:
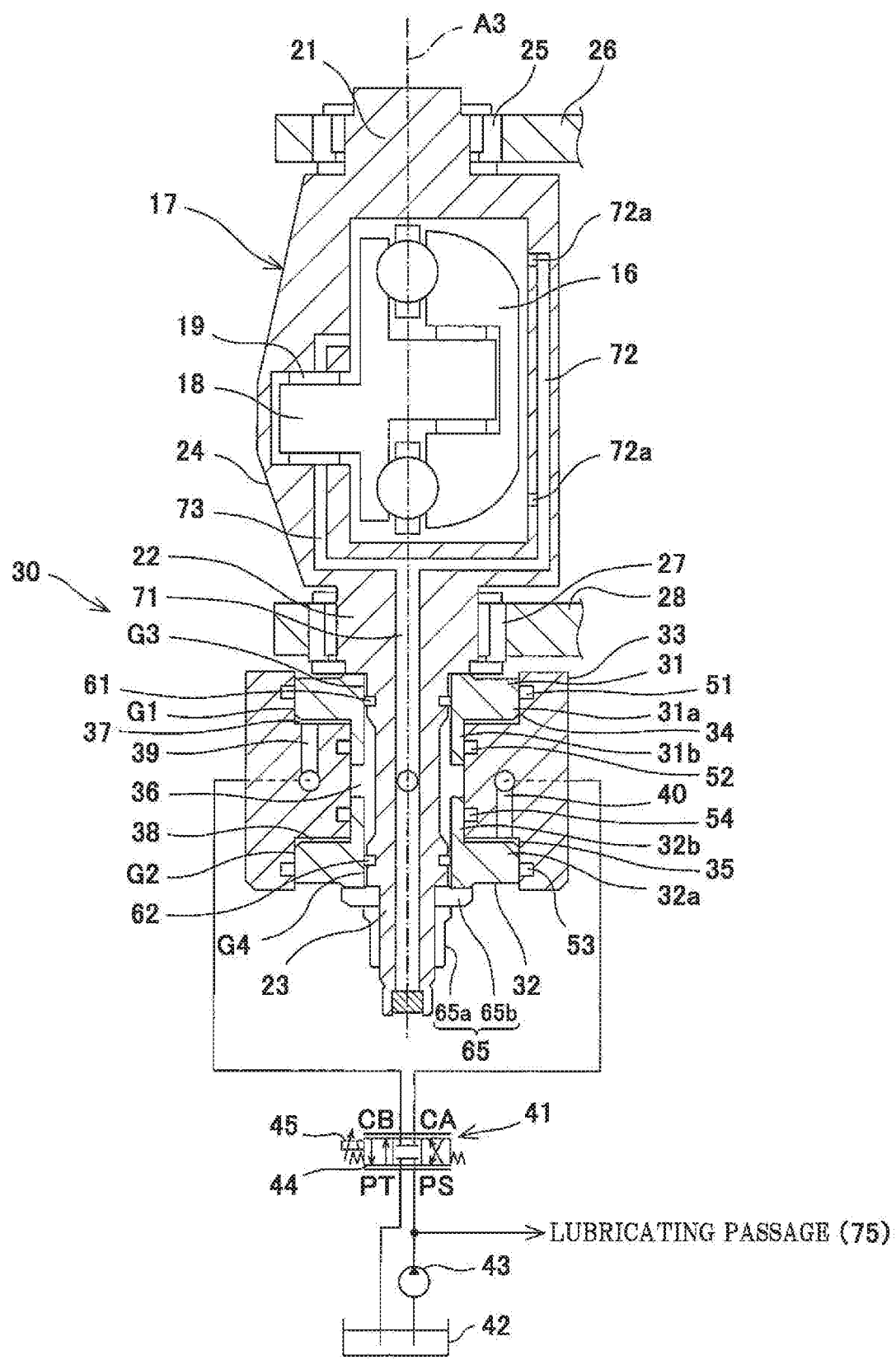
FIG. 2 is a sectional view showing a power roller, trunnion, and hydraulic actuator of the toroidal continuously variable transmission shown in FIG. 1.

FIG. 2 is a sectional view showing the power roller 16, trunnion 17, and hydraulic actuator 30 of the toroidal continuously variable transmission 10 shown in FIG. 1. As shown in FIG. 2, the trunnion 17 includes: first to third shaft portions 21 to 23 arranged coaxially; and a main body portion 24 to which the power roller 16 is attached so as to be rotatable about the rotation axis A2. Central axes of the first to third shaft portions 21 to 23 coincide with the tilt axis A3. The main body portion 24 is located between the first shaft portion 21 and the second shaft portion 22 in the direction along the tilt axis A3. The third shaft portion 23 (shaft portion) is smaller in diameter than the second shaft portion 22. The third shaft portion 23 projects from the second shaft portion 22 in the direction along the tilt axis A3 toward an opposite side of the main body portion 24.

The first shaft portion 21 is fitted into a through hole of a first yoke 26 through a bearing 25. The second shaft portion 22 is fitted into a through hole of a second yoke 28 through a bearing 27. The pair of yokes 26 and 28 are supported by the casing 2 (see FIG. 1). The trunnion 17 is supported by the casing 2 through the yokes 26 and 28 so as to be tiltable about the tilt axis A3 and movable in the direction along the tilt axis A3.

The hydraulic actuator 30 is provided so as to correspond to the third shaft portion 23 of the trunnion 17. The trunnion 17 is driven by the hydraulic actuator 30 to reciprocate in the direction along the tilt axis A3. The hydraulic actuator 30 includes a first piston 31, a second piston 32, and a cylinder 33 configured to accommodate the first and second pistons 31 and 32. The first piston 31 and the second piston 32 are attached to the third shaft portion 23 of the trunnion 17 so as to be externally fitted to the third shaft portion 23. The first and second pistons 31 and 32 are arranged so as to be spaced apart from each other and be lined up in the direction along the tilt axis A3.

The cylinder 33 includes a first recess 34, a second recess 35, and a communication hole 36. The first recess 34 is formed on an end surface of the cylinder 33, the end surface being located at a first side in the direction along the tilt axis A3. The second recess 35 is formed on an end surface of the cylinder 33, the end surface being located at a second side in the direction along the tilt axis A3. The communication hole 36 makes the first recess 34 and the second recess 35 communicate with each other. The first circular recess 34, the second circular recess 35, and the circular communication hole 36 are formed coaxially with the tilt axis A3. The first recess 34 and the second recess 35 are open outward in the direction along the tilt axis A3 of the cylinder 33. Each of the space of the first recess 34 and the space of the second space 35 is larger than the communication hole 36 in an axially perpendicular direction (for example, a radial direction) perpendicular to the tilt axis A3. The communication hole 36 extends in the direction along the tilt axis A3 in the cylinder 33. Both ends of the communication hole 36 are open on a bottom surface of the first recess 34 and a bottom surface of the second recess 35. It should be noted that in the present embodiment, each of the first recess 34, the second recess 35, and the communication hole 36 has a circular section which is perpendicular to the tilt axis A3, but the section may have a shape other than the circular shape. Further, the cylinder 33 may be formed separately from or integrally with the casing 2.

The first piston 31 includes a first piston main body portion 31a and a first boss portion 31b. The first boss portion 31b projects in the direction along the tilt axis A3 from an inner-diameter side of the first piston main body portion 31a. In the present embodiment, the first boss portion 31b projects toward the second piston 32. The first piston main body portion 31a is larger in the axially perpendicular direction than the first boss portion 31b. The first piston main body portion 31a is accommodated in the first recess 34 and includes a pressure receiving surface opposed to the first recess 34 in the direction along the tilt axis A3. The first boss portion 31b is inserted into the communication hole 36. The second piston 32 includes a second piston main body portion 32a and a second boss portion 32b. The second boss portion 32b projects in the direction along the tilt axis A3 from an inner-diameter side of the second piston main body portion 32a. In the present embodiment, the second boss portion 32b projects toward the first piston 31. The second piston main body portion 32a is larger in the axially perpendicular direction than the second boss portion 32b. The second piston main body portion 32a is accommodated in the second recess 35 and includes a pressure receiving surface opposed to the second recess 35 in the direction along the tilt axis A3. The second boss portion 32b is inserted into the communication hole 36. Each of the first piston 31 and the second piston 32 includes a through hole which extends in the direction along the tilt axis A3 and into which the third shaft portion 23 is inserted.

A first pressure chamber 37 is formed between the first piston main body portion 31a and the first recess 34. A second pressure chamber 38 is formed between the second piston main body portion 32a and the second recess 35. To be specific, the first and second pressure chambers 37 and 38 are arranged between the first piston 31 and the second piston 32 in the direction along the tilt axis A3. As pressure in the first pressure chamber 37 increases, the first piston 31 moves to the first side (upper side in FIG. 2) in the direction along the tilt axis A3 together with the trunnion 17. As pressure in the second pressure chamber 38 increases, the second piston 32 moves to the second side (lower side in FIG. 2) in the direction along the tilt axis A3 together with the trunnion 17.

The cylinder 33 includes a first pressure oil passage 39 and a second pressure oil passage 40. An outlet of the first pressure oil passage 39 is connected to the first pressure chamber 37. Pressure oil is supplied from the first pressure oil passage 39 to the first pressure chamber 37. An outlet of the second pressure oil passage 40 is connected to the second pressure chamber 38. The pressure oil is supplied from the second pressure oil passage 40 to the second pressure chamber 38. The first and second pressure oil passages 39 and 40 are arranged between the first piston 31 and the second piston 32, i.e., between the first pressure chamber 37 and the second pressure chamber 38.

The hydraulic actuator 30 includes a control valve 41. The control valve 41 includes a supply port PS, a return port PT, and speed change control ports CA and CB. A hydraulic pump 43 configured to suck oil from an oil tank 42 (which also serves as the casing 2 in the present embodiment) is connected to the supply port PS, and the return port PT is connected to the oil tank 42. The hydraulic pump 43 may be driven by rotational power taken out from the input mechanism 4 or power transmission mechanism 6 of the IDG 1. The speed change control port CA is connected to the second pressure chamber 38, and the speed change control port CB is connected to the first pressure chamber 37.

The control valve 41 is a three-position switching spool valve. A spool 44 of the control valve 41 is positioned at a blocking region (middle position in FIG. 2), a speed-increase region (left position in FIG. 2), or a speed-decrease region (right position in FIG. 2). To be specific, connection statuses of the ports of the control valve 41 change in accordance with the position of the spool 44. The control valve 41 is an electromagnetic valve and includes a driving portion 45 configured to drive the spool 44 to control the position of the spool. The driving portion 45 controls the position of the spool 44 in accordance with a drive signal input from a controller (not shown).

A minute first outside gap G1 is formed between an outer peripheral surface of the first piston 31 and an inner peripheral surface of the cylinder 33 in the axially perpendicular direction. A first large-diameter seal ring 51 is sandwiched between an outer peripheral surface of the first piston main body portion 31a and an inner peripheral surface of the first recess 34. A first small-diameter seal ring 52 is sandwiched between an outer peripheral surface of the first boss portion 31b and an inner peripheral surface of the communication hole 36. Similarly, a minute second outside gap G2 is formed between an outer peripheral surface of the second piston 32 and the inner peripheral surface of the cylinder 33. A second large-diameter seal ring 53 is sandwiched between an outer peripheral surface of the second piston main body portion 32a and an inner peripheral surface of the second recess 35. A second small-diameter seal ring 54 is sandwiched between an outer peripheral surface of the second boss portion 32b and the inner peripheral surface of the communication hole 36.

A first inside gap G3 (inside gap) is formed between an inner peripheral surface of the first piston 31 and an outer peripheral surface of the third shaft portion 23 of the trunnion 17 in the axially perpendicular direction. The first inside gap G3 is formed entirely between the inner peripheral surface of the first piston 31 and the outer peripheral surface of the third shaft portion 23 of the trunnion 17 in the direction along the tilt axis A3. A first sealing member 61 is sandwiched between the inner peripheral surface of the first piston 31 and the outer peripheral surface of the third shaft portion 23 of the trunnion 17. Similarly, a second inside gap G4 (inside gap) is formed between an inner peripheral surface of the second piston 32 and the outer peripheral surface of the third shaft portion 23 of the trunnion 17 in the axially perpendicular direction. The second inside gap G4 is formed entirely between the inner peripheral surface of the second piston 32 and the outer peripheral surface of the third shaft portion 23 of the trunnion 17 in the direction along the tilt axis A3. A second sealing member 62 is sandwiched between the inner peripheral surface of the second piston 32 and the outer peripheral surface of the third shaft portion 23 of the trunnion 17.

In the axially perpendicular direction, each of narrowest clearances of the inside gaps G3 and G4 is larger than each of narrowest clearances of the outside gaps G1 and G2. It is preferable that in the axially perpendicular direction, each of widest clearances of the inside gaps G3 and G4 be larger than each of widest clearances of the outside gaps G1 and G2. A portion of the third shaft portion 23 which portion is located between a portion where the first sealing member 61 is provided and a portion where the second sealing member 62 is provided is reduced in size (for example, reduced in diameter) in the axially perpendicular direction. To be specific, each of a radial clearance of a region between the first boss portion 31b and the third shaft portion 23 in the inside gap G3 and a radial clearance of a region between the second boss portion 32b and the third shaft portion 23 in the inside gap G4 is larger than each of a radial clearance of a region between the first piston main body portion 31a and the third shaft portion 23 in the inside gap G3 and a radial clearance of a region between the second piston main body portion 32a and the third shaft portion 23 in the inside gap G4.

The first piston 31 and the second piston 32 are attached to the third shaft portion 23 of the trunnion 17 so as to be movable relative to the third shaft portion 23 in both the radial direction and the circumferential direction. To be specific, the first and second pistons 31 and 32 are movable in the radial direction relative to the third shaft portion 23 of the trunnion 17 by the elastic deformation of the first and second sealing members 61 and 62 and are also movable relative to the third shaft portion 23 of the trunnion 17 in the circumferential direction about the tilt axis A3 by sliding on the first and second sealing members 61 and 62.

An end surface of the first piston 31 which surface is located opposite to the first pressure chamber 37 is opposed to the second shaft portion 22 of the trunnion 17 so as to be able to contact the second shaft portion 22. To be specific, a cap fixed to the cylinder 33 does not exist between the second shaft portion 22 of the trunnion 17 and the first piston 31. A fixing member 65 is fixed to an end portion of the third shaft portion 23. The fixing member 65 includes, for example, a nut 65 and a washer 65b. An end surface of the second piston 32 which surface is located opposite to the second pressure chamber 38 is opposed to an end surface (for example, an end surface of the washer 65b) of the fixing member 65 so as to be able to contact the end surface of the fixing member 65.

A surface film (for example, a DLC film) having lower friction coefficient than the surface of the second shaft portion 22 and the surface of the first piston 31 is provided as a slide member on at least one of an opposing surface of the second shaft portion 22 which surface is opposed to the first piston 31 and an end surface of the first piston 31 which surface is opposed to the second shaft portion 22. Further, a surface film (for example, a DLC film) having lower friction coefficient than the surface of the second piston 32 and the surface of the fixing member 65 is provided as a slide member on at least one of a surface of the fixing member 65 which surface is opposed to the second piston 32 and an end surface of the second piston 32 which surface is opposed to the fixing member 65. It should be noted that the surface films may be omitted.

The trunnion 17 includes a shaft lubricating oil passage 71 (second lubricating oil passage) formed in the third shaft portion 23. The shaft lubricating oil passage 71 extends inside the third shaft portion 23 in the direction along the tilt axis A3. Lubricating oil from the shaft lubricating oil passage 71 is supplied to the power roller 16 through an oil passage formed at the main body portion 24. For example, the main body portion 24 includes a first main body lubricating oil passage 72 and a second main body lubricating oil passage 73 which are connected to the shaft lubricating oil passage 71. The first main body lubricating oil passage 72 includes a discharge port 72a that is open toward the power roller 16. The second main body lubricating oil passage 73 is open toward, for example, a bearing 19 interposed between the main body portion 24 and the base member 18. To be specific, the lubricating oil from the shaft lubricating oil passage 71 flows through the first main body lubricating oil passage 72 to be discharged toward the power roller 16 and also flows through the second main body lubricating oil passage 73 to be discharged to, for example, the bearing 19 of the base member 18.

Figure 3:
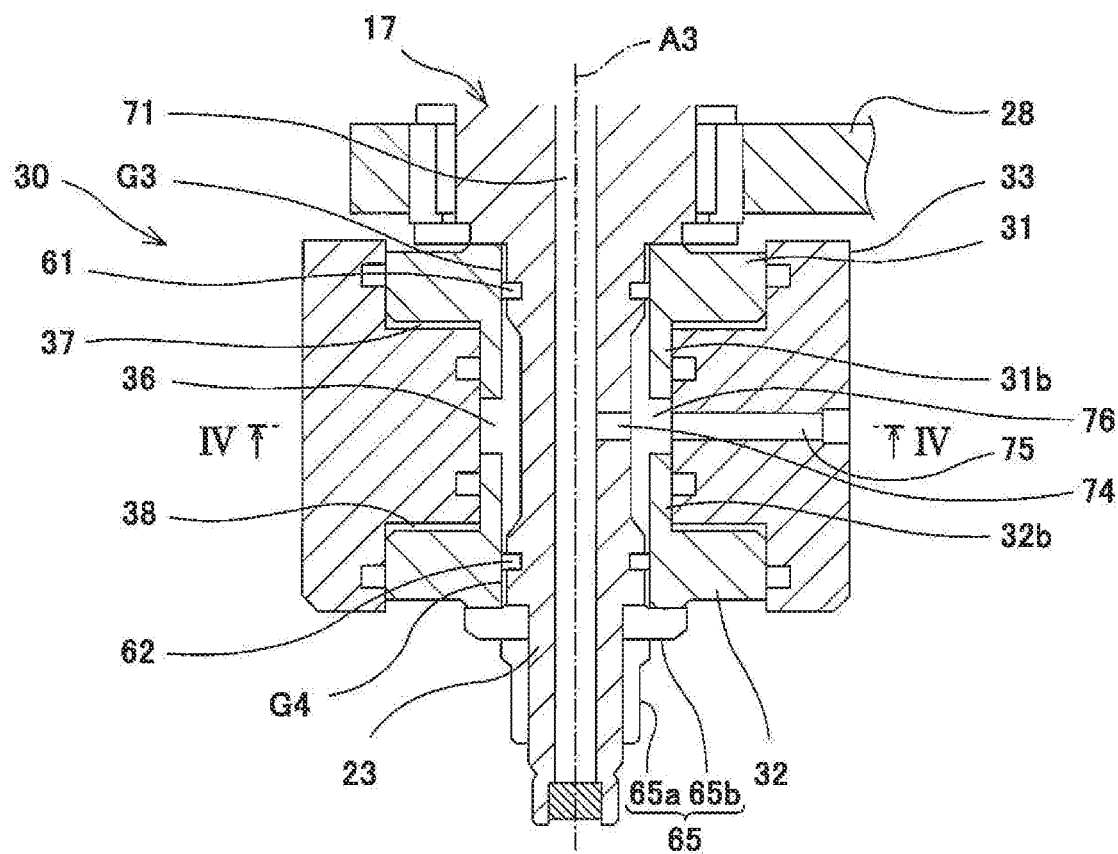
FIG. 3 is a sectional view of the hydraulic actuator of FIG. 2 when viewed from a position different from FIG. 2 by 90°.
Figure 4:
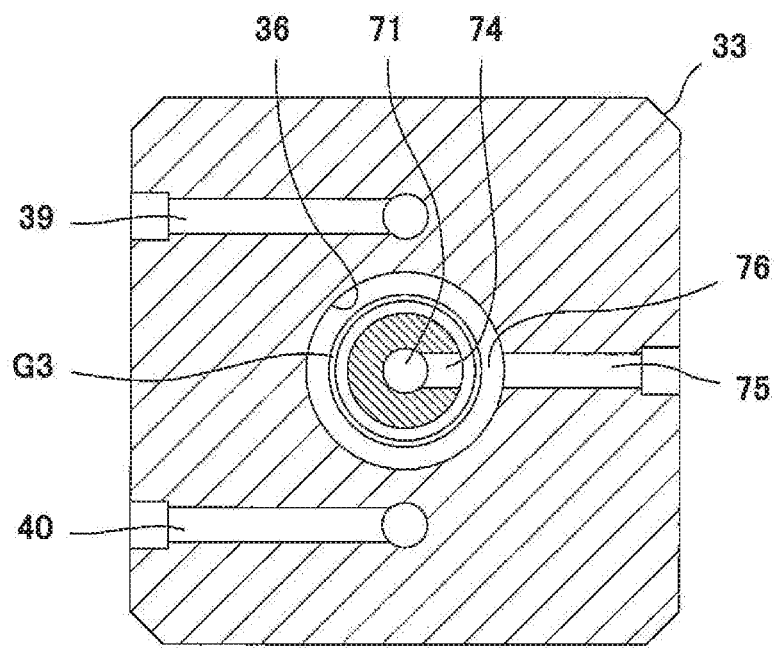
FIG. 4 is a sectional view taken along line IV-IV of FIG. 3.

FIG. 3 is a sectional view of the hydraulic actuator 30 of FIG. 2 when viewed from a position different from FIG. 2 by 90°. FIG. 4 is a sectional view taken along line IV-IV of FIG. 3. As shown in FIGS. 3 and 4, a lubricating oil inflow opening 74 is formed at the third shaft portion 23 of the trunnion 17. The lubricating oil inflow opening 74 communicates with the shaft lubricating oil passage 71 and is open outward in the radial direction. The lubricating oil inflow opening 74 is open toward a space between the first piston 31 and the second piston 32. The cylinder 33 includes a cylinder lubricating oil passage 75 (first lubricating oil passage) to which the lubricating oil from the hydraulic pump 43 (FIG. 2) is supplied. The cylinder lubricating oil passage 75 is open toward the space between the first piston 31 and the second piston 32.

To be specific, the space between the first piston 31 and the second piston 32 in the circular communication hole 36 of the cylinder 33, i.e., a space between the first boss portion 31b and the second boss portion 32b serves as a relay lubricating oil passage 76 (third lubricating oil passage) through which the cylinder lubricating oil passage 75 communicates with the shaft lubricating oil passage 71 (lubricating oil inflow opening 74). With this, a hole as the relay lubricating oil passage 76 does not have to be formed at the first piston 31 or the second piston 32. Thus, the configuration is simplified, and manufacture is facilitated.

The relay lubricating oil passage 76 communicates with the inside gap G3 between the inner peripheral surface of the first piston 31 and the outer peripheral surface of the third shaft portion 23 and the inside gap G4 between the inner peripheral surface of the second piston 32 and the outer peripheral surface of the third shaft portion 23. Therefore, the lubricating oil which has reached the inside gap G3 through the relay lubricating oil passage 76 suitably lubricates between the first piston 31 and the third shaft portion 23 of the trunnion 17, and the lubricating oil which has reached the inside gap G4 through the relay lubricating oil passage 76 suitably lubricates between the second piston 32 and the third shaft portion 23 of the trunnion 17.

Figure 5:
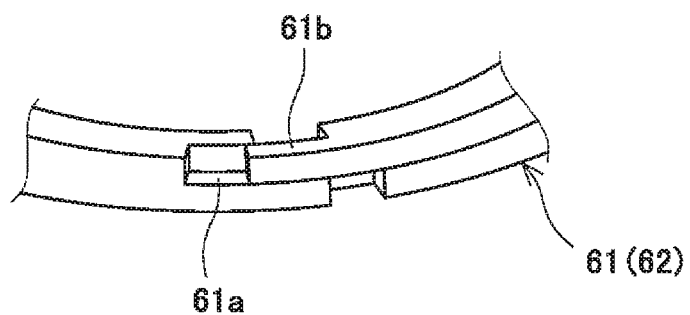
FIG. 5 is a perspective view showing major components of a first seal ring (second seal ring) shown in FIG. 4.

The first sealing member 61 and the second sealing member 62 are the same in structure as each other. Therefore, the first sealing member 61 will be mainly described. As shown in FIG. 5, the first sealing member 61 includes a cutout. For example, the first sealing member 61 includes a first end portion and a second end portion. The first sealing member 61 extends in a circular shape, and the first end portion is opposed to the second end portion. Specifically, an engagement groove 61a is formed at the first end portion of the first sealing member 61, and an engagement projection 61b that engages with the engagement groove 61a is formed at the second end portion of the first sealing member 61.

To be specific, the first sealing member 61 is not an endless ring but forms a substantially ring shape since the first end portion and the second end portion overlap each other. Therefore, as shown in FIG. 3, the lubricating oil which has reached the first and second inside gaps G3 and G4 through the relay lubricating oil passage 76 is made to stay at the first and second inside gaps G3 and G4 by the first and second sealing members 61 and 62 but flows out little by little through a minute gap between the first end portion and second end portion of the first sealing member 61 and a minute gap between the first end portion and second end portion of the second sealing member 62. Thus, the lubricating oil suitably lubricates between the first piston 31 and the third shaft portion 23 of the trunnion 17 and between the second piston 32 and the third shaft portion 23 of the trunnion 17.

The cylinder lubricating oil passage 75, the first pressure oil passage 39, and the second pressure oil passage 40 are formed in a region of the cylinder 33, the region being located between the first pressure chamber 37 and the second pressure chamber 38 in the direction along the tilt axis A3. The cylinder lubricating oil passage 75 extends in the radial direction of the tilt axis A3. Specifically, the position of the cylinder lubricating oil passage 75 in the direction along the tilt axis A3 overlaps the position of a part of the first pressure oil passage 39 in the direction along the tilt axis A3 and the position of a part of the second pressure oil passage 40 in the direction along the tilt axis A3. More specifically, a radially-extending portion of the first pressure oil passage 39, a radially-extending portion of the second pressure oil passage 40, and the cylinder lubricating oil passage 75 are provided on the same flat plane but may deviate from each other in the direction along the tilt axis A3. As above, spaces in the direction along the tilt axis A3 are effectively utilized. Therefore, the third shaft portion 23 of the trunnion 17 and the cylinder 33 can be reduced in size in the direction along the tilt axis A3 while forming the lubricating oil passage at the third shaft portion 23 of the trunnion 17. It should be noted that in FIG. 4, the cylinder lubricating oil passage 75 is provided at an opposite side of the first pressure oil passage 39 and the second pressure oil passage 40. However, the cylinder lubricating oil passage 75 may be provided at the same side as the first pressure oil passage 39 and the second pressure oil passage 40 in accordance with the layout of the oil passages.

Figure 6:
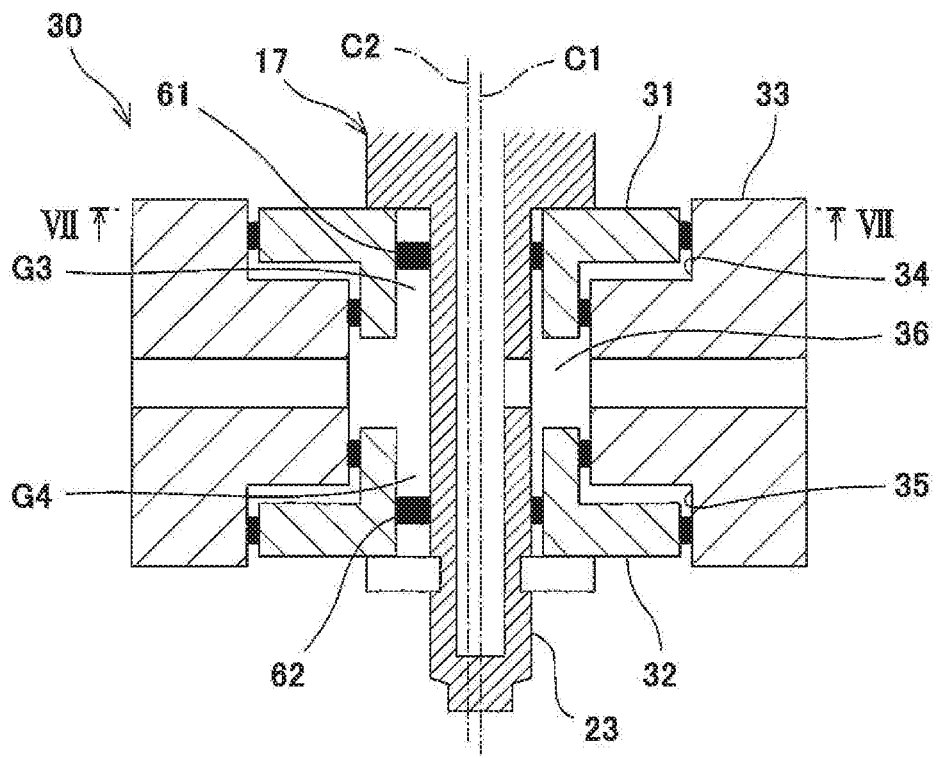
FIG. 6 is a sectional view for schematically explaining, for example, an assembly error of the hydraulic actuator shown in FIG. 4.
Figure 7:
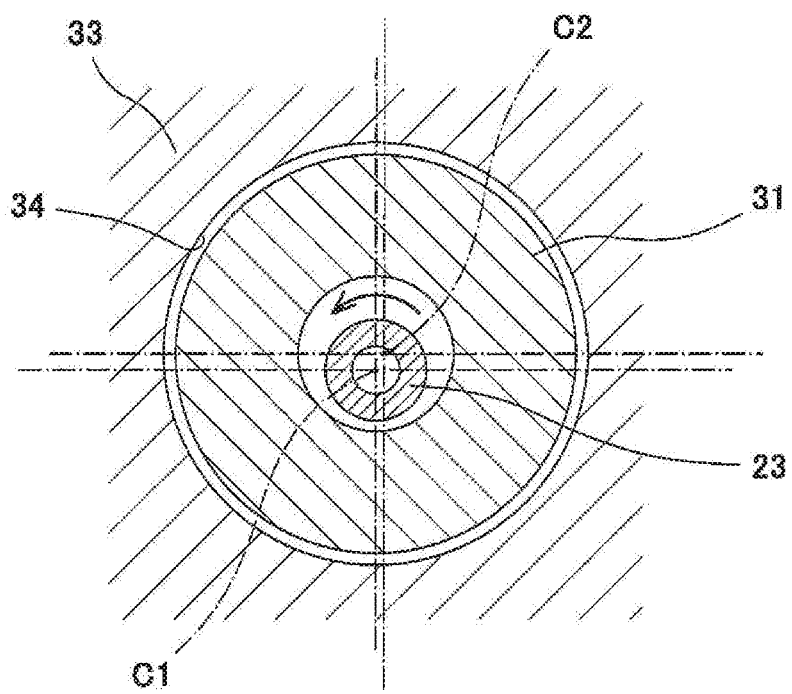
FIG. 7 is a sectional view taken along line VII-VII of FIG. 6.

FIG. 6 is a sectional view for schematically explaining, for example, an assembly error of the hydraulic actuator 30 shown in FIG. 4. FIG. 7 is a sectional view taken along line VI-VI of FIG. 6. As shown in FIG. 6, a central axis C1 of the trunnion 17 and a central axis C2 of the cylinder 33 (i.e., center axes of the circular recesses 34 and 35 and the circular communication hole 36) may deviate from each other due to the assembly error. Even in this case, the inside gap G3 is formed between the outer peripheral surface of the third shaft portion 23 of the trunnion 17 and the inner peripheral surface of the piston 31, and the inside gap G4 is formed between the outer peripheral surface of the third shaft portion 23 of the trunnion 17 and the inner peripheral surface of the piston 32. Therefore, the pistons 31 and 32 are moved relative to the third shaft portion 23 of the trunnion 17 in the radial direction, and this absorbs unbalanced load. Thus, the imbalance of the sealing pressure between the piston 31 and the cylinder 33 and the imbalance of the sealing pressure between the piston 32 and the cylinder 33 are reduced. Further, even if the trunnion 17 elastically deforms by a load from the power roller 16 (see FIG. 2), the pistons 31 and 32 are moved relative to the trunnion 17 in the radial direction, so that interference between the piston 31 and the cylinder 33 and interference between the piston 32 and the cylinder 33 are prevented.

Further, by the sealing member 61 sandwiched between the outer peripheral surface of the third shaft portion 23 of the trunnion 17 and the inner peripheral surface of the piston 31 and the sealing member 62 sandwiched between the outer peripheral surface of the third shaft portion 23 of the trunnion 17 and the inner peripheral surface of the piston 32, relative movements of the piston 31 and the third shaft portion 23 of the trunnion 17 in the radial direction and relative movements of the piston 32 and the third shaft portion 23 of the trunnion 17 in the radial direction are flexibly absorbed, and vibrations of the piston 31 and the trunnion 17 in the radial direction and vibrations of the piston 32 and the trunnion 17 in the radial direction are prevented. Further, since the first piston 31 and the second piston 32 are configured separately, the first piston 31 and the second piston 32 can be independently moved in the radial direction, and therefore, the unbalanced load generated between the trunnion 17 and the cylinder 33 is suitably absorbed.

Further, as shown in FIG. 7, even when the central axis C1 of the trunnion 17 is eccentric to the central axis C2 of the cylinder 33, the pistons 31 and 32 are movable relative to the trunnion 17 in not only the radial direction but also the circumferential direction. Therefore, even when the trunnion 17 is tilted about the central axis C1 (tilt axis), the trunnion 17 can be moved relative to the pistons 31 and 32 in the circumferential direction (tilt direction), so that the pistons 31 and 32 can be prevented from interfering with the cylinder 33.

Embodiment 2

Figure 8:
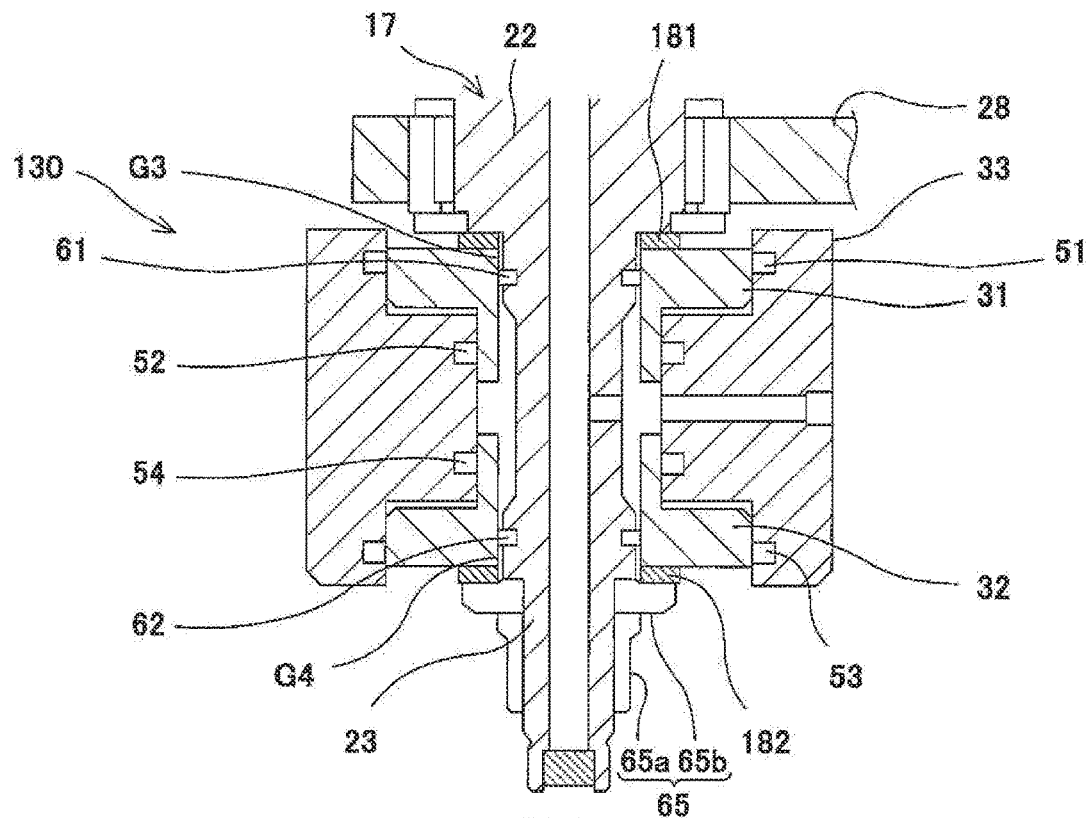
FIG. 8 is a sectional view of the hydraulic actuator of the toroidal continuously variable transmission according to Embodiment 2.

FIG. 8 is a sectional view of a hydraulic actuator 130 of the toroidal continuously variable transmission according to Embodiment 2. It should be noted that the same reference signs are used for the same components as in Embodiment 1, and explanations thereof are omitted. As shown in FIG. 8, in the hydraulic actuator 130 of Embodiment 2, a thrust washer 181 as a slide member is interposed between an end surface of the first piston 31 which surface faces the first side in the direction along the tilt axis A3 and is opposed to the second shaft portion 22 and an end surface of the second shaft portion 22 of the trunnion 17 which surface faces the second side in the direction along the tilt axis A3 and is opposed to the first piston 31. A friction coefficient of a sliding surface of the thrust washer 181 is lower than a friction coefficient of the surface of the second shaft portion 22 and a friction coefficient of the surface of the first piston 31.

Similarly, a thrust washer 182 as a slide member is interposed between an end surface of the second piston 32 which surface faces the second side in the direction along the tilt axis A3 and is opposed to a washer 66 and an end surface of the washer 66 which surface faces the first side in the direction along the tilt axis A3 and is opposed to the second piston 32. A friction coefficient of a sliding surface of the thrust washer 182 is lower than a friction coefficient of the surface of the second piston 32 and a friction coefficient of the surface of the washer 66. It should be noted that since the other components are the same as those of Embodiment 1, explanations thereof are omitted.

Embodiment 3

Figure 9:
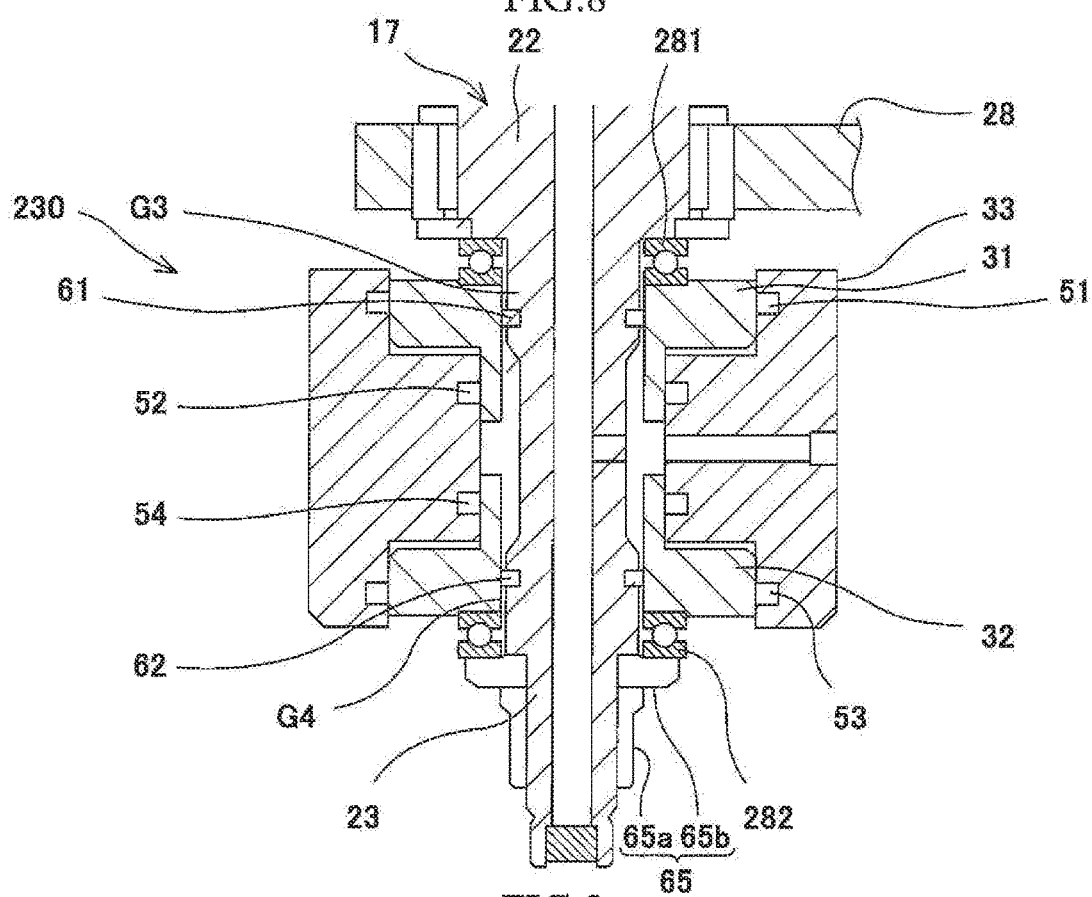
FIG. 9 is a sectional view of the hydraulic actuator of the toroidal continuously variable transmission according to Embodiment 3.

FIG. 9 is a sectional view of a hydraulic actuator 230 of the toroidal continuously variable transmission according to Embodiment 3. It should be noted that the same reference signs are used for the same components as in Embodiment 1, and explanations thereof are omitted. As shown in FIG. 9, in the hydraulic actuator 230 of Embodiment 3, a thrust bearing 281 (for example, a ball bearing or a needle bearing) as a slide member is interposed between an end surface of the first piston 31 which surface faces the first side in the direction along the tilt axis A3 and is opposed to the second shaft portion 22 and an end surface of the second shaft portion 22 of the trunnion 17 which surface faces the second side in the direction along the tilt axis A3 and is opposed to the first piston 31.

Similarly, a thrust bearing 282 as a slide member is interposed between an end surface of the second piston 32 which surface faces the second side in the direction along the tilt axis A3 and is opposed to the washer 66 and an end surface of the washer 66 which surface faces the first side in the direction along the tilt axis A3 and is opposed to the second piston 32. It should be noted that since the other components are the same as those of Embodiment 1, explanations thereof are omitted.

It should be noted that the above-described toroidal continuously variable transmission may be applied to apparatuses other than the IDG Further, in the above-described embodiments, the first piston 31 and the second piston 32 are configured separately. However, the first piston 31 and the second piston 32 do not have to be configured separately. Further, the first and second sealing members 61 and 62 may be omitted. In this case, the lubricating oil easily flows through the inside gaps G3 and G4.

REFERENCE SIGNS LIST 10 toroidal continuously variable transmission
13 input disc
14 output disc
16 power roller
17 trunnion 23 third shaft portion (shaft portion)
30, 130, 230 hydraulic actuator
31 first piston
31a first piston main body portion
31b first boss portion
32 second piston
32a second piston main body portion
32b second boss portion
33 cylinder
37 first pressure chamber
38 second pressure chamber
39 first pressure oil passage
40 second pressure oil passage
61 first sealing member
62 second sealing member
71 shaft lubricating oil passage (second lubricating oil passage)
75 cylinder lubricating oil passage (first lubricating oil passage)
76 relay lubricating oil passage (third lubricating oil passage)
181 thrust washer (slide member)
281 thrust bearing (slide member)
G1, G2 outside gap
G3, G4 inside gap

The invention claimed is:

1. A toroidal continuously variable transmission comprising:
input and output discs arranged so as to be opposed to each other;
a power roller sandwiched between the input disc and the output disc so as to be tiltable, the power roller being configured to transmit rotational driving force of the input disc to the output disc at a transmission ratio corresponding to a tilting angle of the power roller;
a trunnion supporting the power roller and configured to be tiltable about a tilt axis of the power roller and reciprocatable in a direction along the tilt axis, the trunnion including a main body portion and a shaft portion, the main body portion supporting the power roller, the shaft portion extending in the direction along the tilt axis;
first and second pistons attached to the shaft portion of the trunnion so as to be externally fitted to the shaft portion, the first and second pistons being arranged so as to be lined up in the direction along the tilt axis; and
a cylinder forming a first pressure chamber which makes the first piston move toward a first side in the direction along the tilt axis and a second pressure chamber which makes the second piston move toward a second side in the direction along the tilt axis, wherein:
the cylinder formed with a first lubricating oil passage to which lubricating oil is supplied;
the shaft portion includes a second lubricating oil passage through which the lubricating oil flows toward the power roller;
a third lubricating oil passage through which the first lubricating oil passage communicates with the second lubricating oil passage is formed between the first piston and the second piston;
the cylinder further formed with
a first pressure oil passage through which pressure oil supplied to the first pressure chamber and
a second pressure oil passage through which the pressure oil is supplied to the second pressure chamber; and
the first lubricating oil passage, the first pressure oil passage, and the second pressure oil passage are arranged in a region between the first pressure chamber and the second pressure chamber in the direction along the tilt axis; and
a position of at least a part of the first lubricating oil passage in the direction along the tilt axis overlaps a position of a part of at least one of the first pressure oil passage and the second pressure oil passage in the direction along the tilt axis.

2. The toroidal continuously variable transmission according to claim 1, wherein:
the first piston includes
an annular first piston main body portion forming the first pressure chamber and
a tubular first boss portion projecting from an inner-diameter side of the first piston main body portion toward the second piston;
the second piston includes
an annular second piston main body portion forming the second pressure chamber and
a tubular second boss portion projecting from an inner-diameter side of the second piston main body portion toward the first piston; and
the third lubricating oil passage is formed between the first boss portion and the second boss portion.

3. The toroidal continuously variable transmission according to claim 1, wherein a radially-extending portion of the first pressure oil passage, a radially-extending portion of the second pressure oil passage, and the first lubricating oil passage are provided on the same flat plane perpendicular to the shaft portion of the trunnion.

4. A toroidal continuously variable transmission comprising:
input and output discs arranged so as to be opposed to each other;
a power roller sandwiched between the input disc and the output disc so as to be tiltable, the power roller being configured to transmit rotational driving force of the input disc to the output disc at a transmission ratio corresponding to a tilting angle of the power roller;
a trunnion supporting the power roller and configured to be tiltable about a tilt axis of the power roller and reciprocatable in a direction along the tilt axis, the trunnion including a main body portion and a shaft portion, the main body portion supporting the power roller, the shaft portion extending in the direction along the tilt axis;
first and second pistons attached to the shaft portion of the trunnion so as to be externally fitted to the shaft portion, the first and second pistons being arranged so as to be lined up in the direction along the tilt axis; and
a cylinder forming a first pressure chamber which makes the first piston move toward a first side in the direction along the tilt axis and a second pressure chamber which makes the second piston move toward a second side in the direction along the tilt axis, wherein:
the cylinder includes a first lubricating oil passage to which lubricating oil is supplied;
the shaft portion includes a second lubricating oil passage through which the lubricating oil flows toward the power roller;
a third lubricating oil passage through which the first lubricating oil passage communicates with the second lubricating oil passage is formed between the first piston and the second piston;

a first inside gap is formed between an inner peripheral surface of the first piston and an outer peripheral surface of the shaft portion of the trunnion; and a second inside gap is formed between an inner peripheral surface of the second piston and the outer peripheral surface of the shaft portion of the trunnion.

5. The toroidal continuously variable transmission according to claim 4, further comprising:

a first sealing member sandwiched between the inner peripheral surface of the first piston and the outer peripheral surface of the shaft portion of the trunnion; and a second sealing member sandwiched between the inner peripheral surface of the second piston and the outer peripheral surface of the shaft portion of the trunnion, wherein:

the first sealing member includes a first end portion and a second end portion and extends in a circular shape such that the first end portion is opposed to the second end portion; and the second sealing member includes a first end portion and a second end portion and extends in a circular shape such that the first end portion is opposed to the second end portion.

\* \* \* \* \*